United States Patent [19]
Abe et al.

[11] 3,941,981
[45] Mar. 2, 1976

[54] ROLL FILM MARK COUNTER

[75] Inventors: Takeshi Abe; Yoshio Fukushima, both of Tokyo, Japan

[73] Assignee: Kabushiki Kaisha Ricoh, Tokyo, Japan

[22] Filed: Feb. 7, 1974

[21] Appl. No.: 440,517

[30] Foreign Application Priority Data
Feb. 26, 1973  Japan.......................... 48-24363[U]

[52] U.S. Cl....... 235/92 V; 235/92 MP; 235/92 PE; 235/92 R; 353/26 R
[51] Int. Cl.² .................... G06M 3/02; G03B 23/12
[58] Field of Search......... 235/92 V, 92 CT, 92 MP, 235/92 PE, 92 PB, 61.11 E; 250/270; 356/199; 340/259; 353/26

[56] References Cited
UNITED STATES PATENTS

| | | |
|---|---|---|
| 3,299,272 | 1/1967 | Yozofurukawa et al........... 235/92 V |
| 3,673,389 | 6/1972 | Kapsambelis et al. ....... 235/61.11 E |
| 3,689,742 | 9/1972 | Yoshiharukagari............. 235/92 PE |
| 3,778,630 | 12/1973 | White et al. ................... 235/92 MP |
| 3,820,884 | 6/1974 | Yoshiakisone........................ 353/26 |

Primary Examiner—Joseph M. Thesz, Jr.
Attorney, Agent, or Firm—Frank J. Jordan

[57] ABSTRACT

A mark counter is able to count frame marks in one film margin adjacent to corresponding frames and group marks in the other film margin adjacent to the first frames of each group of frames regardless of which margin contains the frame marks and which margin contains the group marks. The marks in both margins are sensed, and analogous signals are fed into an OR gate and an AND gate. The output of the OR gate is the logical sum of the number of sensed frame and group marks which is numerically equal to the number of sensed frame marks, and the output of the AND gate is the logical product of the number of sensed frame and group marks which is numerically equal to the number of sensed group marks.

9 Claims, 4 Drawing Figures

ROLL FILM MARK COUNTER

The present invention generally relates to a device for retrieving information stored on a roll of film, and more particularly to an improved mark counter for counting frame and group marks provided on the film for the purpose of controlling the film transport.

It is well known in the art to photographically or otherwise impress graphical or other information on an elongated strip of material such as microfilm. An information retrieval device such as a microfilm reader is commonly employed to provide visual access to the information or project an image of the information impressed on the film onto a photosensitive material to obtain a semi-permanent copy. The information is generally provided on the film in the form of discrete longitudinally spaced frames, and to provide rapid access to the information, a frame mark is provided in the film margin adjacent to each frame. In a system to which the invention applies, a group mark is provided in the other film margin adjacent to the first frame of each selected group of frames. These marks are optically sensed and electronically counted as the film is moved through the retrieval device, so that if the film transport is stopped after a certain number of marks has been counted, the frame adjacent to the last marked counted will be in an information retrieval or read-out position in the device. If the frames are consecutively numbered and the number of a frame for which information retrieval is desired is known, the frame number can be manually entered into the retrieval device and the frame marks counted as the film moves through the device. When the count reaches the number of the desired frame, film transport will be stopped and the desired frame will be in the information retrieval position. The actual desired frame may be selected by counting the frame marks, or the first frame of a desired group of frames may alternatively be selected by counting the group marks. This system has proven quite useful and reliable, but a problem remains in that manufacturers have begun producing film in two distinct types; one type in which one margin contains the frame marks and the other margin contains the group marks, and another type in which the relative positions of the frame and group marks are reversed. If a separate photoelectric sensor is arranged adjacent to each margin, a sensor does not know whether it is sensing frame or group marks. Retrieval devices have been provided with manual changeover switches to solve this problem, but these are a nuisance to operate and if a mistake is made in the setting of the switch prior to a frame selection operation, incorrect operation will result and the film must be completely rewound and the operation started again with the switch set in the correct position.

It is therefore an object of the present invention to provide an information retrieval device as described above which is capable of accommodating film on which frame and group marks are provided in opposite film margins regardless of which margin contains the frame mark and vice versa, and which does not require any manual changeover operation pertaining to the relative positions of the frame and group marks.

It is another object of the present invention to provide a mark counter for an information retrieval device as described above which is capable of correctly counting frame and group marks during film transport regardless of the relative positions of the frame and group marks.

It is another object of the present invention to provide a mark counter for an information retrieval device comprising, as will become clear from the following detailed description, a novel combination of electronic logic elements to compute the logical sum and product of the numbers of frame and group marks sensed to enable the mark counter to correctly count the frame and group marks regardless of their relative positions.

It is still another object of the present invention to provide an improved information retrieval device as described above which is capable of correctly placing a desired frame or the first frame of a desired group of frames in an information retrieval position after the frame number or group number is manually entered into the device regardless of the relative positions of the frame and group marks.

The above and other objects, features and advantages of the present invention will become clear from the following detailed description taken in conjunction with the accompanying drawings, in which.

Figure 3:
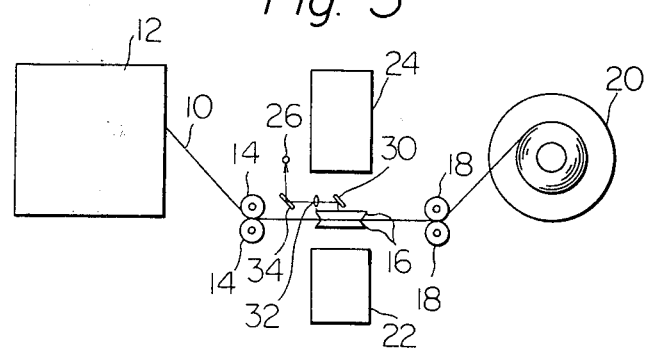
Figure 4:
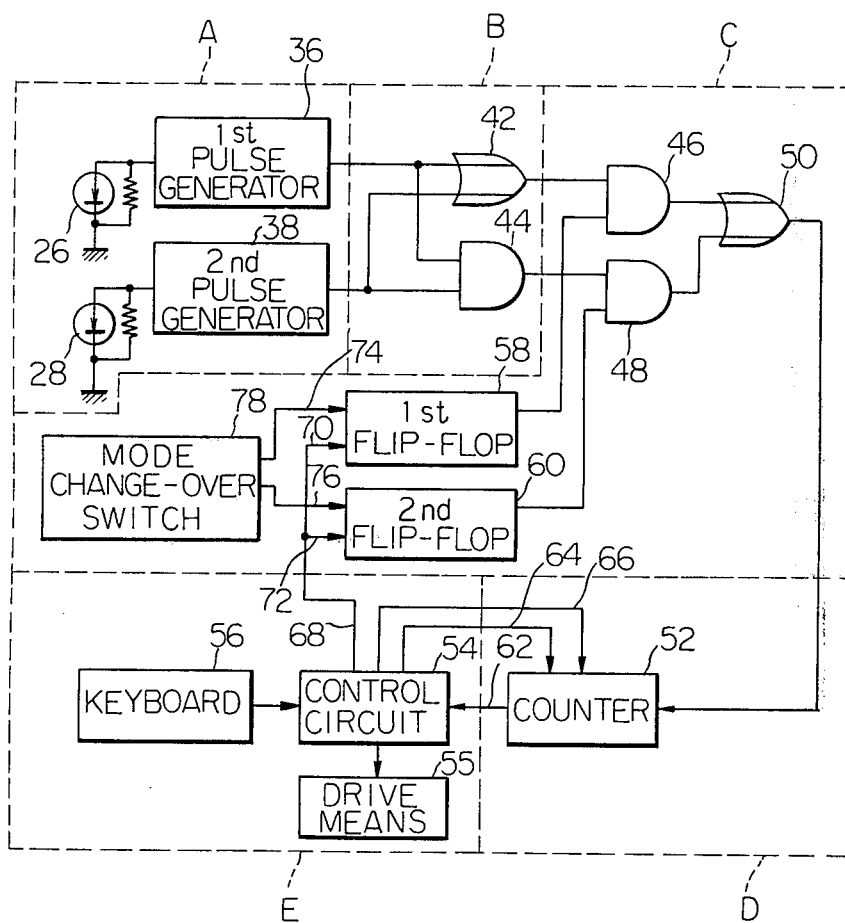

FIG. 3 is a schematic view of information read-out means, film drive means and mark sensing means of an embodiment of an information retrieval device according to the present invention; and FIG. 4 is an electrical block diagram of an embodiment of a mark counter to be employed in conjunction with the elements of FIG. 3 to constitute an information retrieval device according to the present invention.

Figure 1:
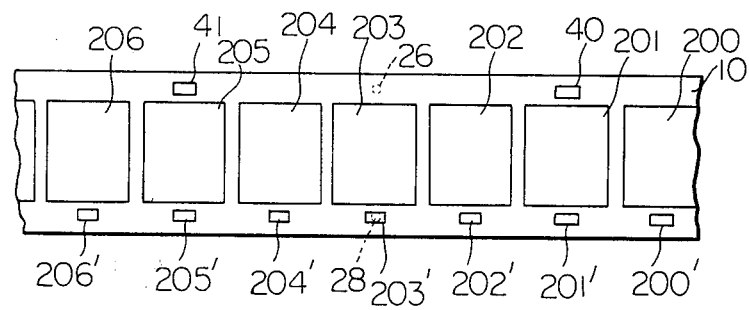
FIG. 1 is a schematic view of a portion of a roll of film to which the invention relates illustrating the relative positions of frames, frame marks and group marks.

Referring now to FIG. 1, a portion of an elongated strip of material here shown as a roll of film 10 has longitudinally spaced frames 200 to 206 containing retrievable information. The film 10 may be microfilm containing information in the form of variations in optical density. Frame marks 200' to 206' are detachable as variations in optical density, are located in a lower (as shown) margin of the film 10 adjacent to the frames 200 to 206 respectively, and are centered in the margin between the ends of the respective frames. Group marks 40 and 41 are similarly located in the upper (as shown) margin of the film 10 adjacent to the frames 201 and 205 respectively, thus indicating that the frames 201 and 205 are the first frames of selected groups of frames constituted by frames 201 to 204, and frames 205 and 206 respectively, the groups being selected because they contain differently classified information.

Figure 2:
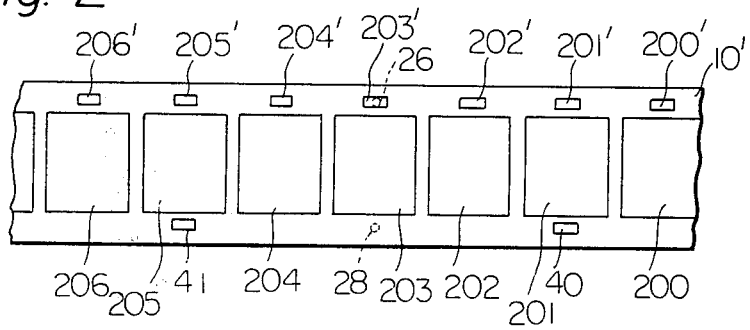
FIG. 2 is similar to FIG. 1, but illustrates another type of film in which the relative positions of the frame and group marks are reversed from those of the film of FIG. 1.

FIG. 2 is a similar to FIG. 1 and shows a film 10' which may be made by a different manufacturer than the film 10 or may be made by the same manufacturer as the film 10 but for a different model of information retrieval device. The only difference is that the relative positions of the frame and group marks of the film 10' are opposite to those of the film 10, with the film 10' having the frame marks in the upper margin and the group marks in the lower margin as shown. If the film 10' were used in a device designed for the film 10, erroneous operation would result because the group marks would be counted rather than the frame marks and vice versa.

An information retrieval device of the invention is designed to automatically adapt itself to operation with either the film 10 or the film 10', and is partially shown in FIG. 3. The film 10 is stored in a cartridge 12 which is inserted into the device for information retrieval. The leader (not shown) of the film 10 is threaded through rollers 14, pressure plates 16 and rollers 18 and wound around a take-up reel 20. These components, taken in conjunction with electric motors (not shown) to drive the film supply reel (not shown) in the cartridge 12 and the take-up reel 20 constitute drive means to move the film 10 through the information retrieval device. Read-out means to retrieve the information from the film 10 comprise a light source 22 to project a beam of light through the film 10, and a reader 24 which may provide a visual image of the desired frame of the film 10 or contain a photosensitive material to provide a semi-permanent copy of the desired frame. Sensing means comprising first and second sensors 26 and 28 arranged adjacent to the upper and lower margins (as shown) of the film 10 or 10' are used to sense whichever of the frame or group marks are in the adjacent margin as the film 10 or 10' is transported through the read-out means. The sensing means also comprises an optical system having a first plane mirror 30, a convex lens 32 and a second plane mirror 34 to project a beam of light from the light source 22 passing through the upper margin of the film 10 or 10' onto the first sensor 26, as is schematically shown in FIGS. 1 and 2. A similar optical system is provided for the second sensor 28 to project a beam of light from the lower margin of the film 10 or 10' thereonto although not shown. If the first and second sensors 26 and 28 are assumed to be photocells, and the frame and group marks are assumed to be optically denser than the remainder of the margins, the sensors 26 and 28 will produce a predetermined voltage output when the incident light beam has passed through a normal portion of the respective margin, and a lower voltage output when the incident light beam has passed through a frame or a group mark. Thus, a negative pulse is produced every time a frame or a group mark passes the respective sensor 26 or 28.

Referring now to FIG. 4, a novel mark counter according to the invention to be used in conjunction with the drive means and read-out means shown in FIG. 3 comprises the sensing means A, and computing means including a computing circuit B, switch means C and counting means having a counter section D and a control circuit section E. If desired, the switch means C may be considered a part of the control circuit section E, or the control circuit section E may be considered part of counting means comprising the counter section D and alternatively also the switch means C.

The sensing means A comprises the sensors 26 and 28 which are connected to the inputs of pulse generators 36 and 38 respectively. The outputs of the pulse generators 36 and 38 are both fed into inputs of an OR gate 42 and an AND gate 44 constituting the computing circuit B. The outputs of the OR gate 42 and the AND gate 44 are respectively fed into inputs of a first AND gate 46 and a second AND gate 48 of the switch means C. The outputs of both AND gates 46 and 48 are fed into the inputs of an OR gate 50, the output of which is fed into the counter section D, which comprises an incremental and decremental counter 52. A control circuit 54 of the control circuit section E is responsive to the numerical count of the counter 52 through a lead 62 and control the operation of the drive means 55 in such a manner as will be subsequently described. A numerical entry device such as a keyboard 56 is provided to enter a preset value into the control circuit 54. Leads 64 and 66 also connect the control circuit 54 to the counter 52 as will be described in detail below.

A reset output 68 of the control circuit 54 is connected to reset inputs 70 and 72 of first and second bistable devices such as flip-flops 58 and 60 respectively, which have manual set inputs 74 and 76 respectively which may be connected to a mode changeover switch 78. The output of the flip-flops 58 and 60 are fed into inputs of the AND gates 46 and 48 respectively.

In operation, the mode changeover switch 78 is moved to a position to order the mark counter to count either the frame marks or the group marks. If it is desired to count the frame marks, the switch causes the set input 74 of the first flip-flop 58 to be set, whereas if it is desired to count the group marks, the set input 76 of the second flip-flop 60 is set. Next, a preset value corresponding to the number of the frame or group for which information retrieval or read-out is desired is entered into the control circuit 54 through the keyboard 56. The control circuit 54 compares the preset value with the count of the counter 52, and switches the counter 52 to the incremental mode if the preset value is higher than the count of the counter 52 (as is the case when the film 10 or 10' is first threaded through the drive means), and switches the counter 52 to the decremental mode if the preset value is lower than the count of the counter 52. The control circuit 54 will energize the drive means 55 to move the film 10 or 10' in a forward direction to bring a higher numbered frame or group into an information retrieval or read-out position when the counter 52 is in the incremental mode, energize the drive means 55 to move the film 10 or 10' in a reverse direction to bring a lower numbered frame or group into the read-out position when the counter 52 is in the decremental mode, and de-energize or the stop the drive means 55 to place the desired frame or first frame of the desired group of frames in the read-out position when the count of the counter 52 becomes equal to the preset value.

As the film 10 or 10' is moved through the read-out means by the drive means 55, negative pulses are generated by the sensors 26 and 28 as the frame and group marks pass thereby, one pulse for each mark. These pulses are inverted, amplified and shaped to produce first and second electrical signals in the form of positive pulses by the first and second pulse generators 36 and 38 respectively, one pulse for each mark. It makes no difference which of the sensors 26 and 28 is sensing the frame marks and which is sensing the group marks, because the outputs of both the generators 36 and 38 are fed into the inputs of both the OR gate 42 and the AND gate 44.

As is well known in the art, an OR gate having two inputs produces as its output the logical sum of the two inputs, as evidenced from the fact that the Boolean algebra operator associated with an OR gate is a summation or plus "+" sign. Similarly, an AND gate produces as its output the logical product of the two inputs, the associated Boolean algebra operator being a multiplication or times "×" sign. These concepts are cleverly utilized in the computing circuit B constituting the heart of the invention which allows the mark counter to automatically and correctly count the frame and group marks of either the film 10 or the film 10'.

The OR gate 42 produces an output whenever either one or both of its inputs is logical 1 (here assumed as a positive pulse). Since it receives inputs from both of the generators 36 and 38, one of its inputs is a train of positive pulses produced by sensing the frame marks. The OR gate 42 will thus produce an output every time a frame mark is sensed, and the fact that pulses representing sensing of the group marks also appear at its other input have no effect on its operation because they are coincident with the pulses representing the frame marks. The number of pulses passing through the OR gate 42 is thus the same as the number of sensed frame marks. The output signals of the OR gate 42 are thus called sum signals.

The AND gate 44 produces an output whenever both of its inputs are logical 1. This condition only occurs when a group mark is sensed, because a frame mark is sensed simultaneously due to the fact that a frame mark and a group mark of a given frame have the same longitudinal position on the film 10 or 10'. Thus, the number of pulses passing through the AND gate 44 is the same as the number of sensed group marks. The output signals of the AND gate 44 are thus called product signals.

The switch means C enables the mark counter to selectively count either the frame marks or the group marks. The preset value entered into the control circuit 54 by the keyboard 56 is the number of the frame or group for which information retrieval is desired, but the counter 52 and control circuit 54 cannot distinguish between pulses representing frame marks or group marks. For this reason, a frame or group mode is selected by the mode changeover switch 78 as mentioned above. If it is desired to count frame marks, the set input 74 of the flip-flop 58 is set by the switch causing a logical 1 (positive) voltage to be applied from the flip-flop 58 to the input of the AND gate 46. In this way, positive pulses from the OR gate representing sensed frame marks will pass through the AND gate 46 since both inputs of the AND gate 46 at the time of pusle occurance are positive. Since the flip-flop 60 is not set, it will apply a logical 0 signal (zero volts) to the AND gate 48. Since one of the inputs of the AND gate 48 is therefore logical 0, pulses from the AND gate 44 are blocked by the AND gate 48.

In a similar manner, the set input 76 of the flip-flop 60 is set by the mode changeover switch 78 to enable the AND gate 48 and inhibit the AND gate 46 when it is desired to count the group marks. The OR gate 50 passes therethrough to the counter 52 any pulses applied thereto from the AND gates 46 and 48.

If the counter 52 is in the incremental mode, the numerical value or count of the counter 52 will be incremented each time a pulse is received from the OR gate 50, and the control circuit 54 will stop the drive means when the count of the counter 52 reaches the preset value so that the desired frame or the first frame of the desired group will be placed in the information retrieval position. Similarly, if the counter 52 is in the decremental mode, the count of the counter 52 will be decremented each time a pulse is received from the OR gate 50.

The control circuit 54 is further designed to feed a reset pulse into the reset inputs 70 and 72 of the flip-flops 58 and 60 respectively when the count of the counters 52 reaches the preset value to reset the flip-flops 58 and 60 to normally logical 0 states, such that the AND gate 46 and 48 are inhibited and electrical communication therethrough is blocked As an illustrative example, it will be assumed that the device is in a frame mark counting mode and frame 200 (see FIG. 1) is in the read-out position. It is subsequently desired to read-out frame 206. At this point the numerical count of the counter 52 is 200, and the number 206 is entered into the control circuit 54 through the keyboard 56. Since 206 is numerically higher than 200, the control circuit 54 will switch the counter 52 to the incremental mode. The drive means 55 will then transport the film in a forward direction, and the frame marks 201' to 206' will be sensed by the sensor 26. Pulses representing these frame marks will pass through the generator 36, the OR gate 42, the AND gate 46 (since the flipflop 58 is set) and the OR gate 50 to the counter 52. As frame 206 approaches the read-out position, frame marks 201' to 205' are counted and the count of the counter 52 is incremented five times. At this point, the count of the counter 52 is 205, or one less than the preset value 206. As frame 206 reaches the read-out position, the frame mark 206' is sensed and the count of the counter 52 becomes 206 or equal to the preset value. At this point, the control circuit 54 stops the drive means 55 so that the desired frame 206 is placed in the read-out position.

Although the computing circuit B has been described as comprising the OR gate 42 and the AND gate 44, the generators 36 and 38 may be omitted or arranged to amplify but not invert the signals from the first and second sensors 26 and 28 respectively. In this case, identical operation of the mark counter can be obtained by replacing the OR gate 42 and the AND gate 44 with a NOR gate and NAND gate respectively.

What is claimed is:

1. In a device for retrieving information stored on an elongated strip of material in the form of longitudinally successive frames, the elongated strip having a detectable frame mark adjacent to each frame and a detectable group mark adjacent to the first frame of each group of frames, and the device having read-out means for retrieving the information from a desired frame and drive means for moving the elongated strip through the read-out means to place the desired frame in an information retrieval position, a mark counter to count the frame marks and group marks as the elongated strip is being moved through the read-out means by the drive means and control the drive means to stop movement of the elongated strip when the desired frame has reached the information retrieval position, said mark counter comprising:

sensing means operatively arranged to sense the frame marks and group marks as the elongated strip moves through the read-out means and produce a first and a second electrical signal each time a frame mark and a group mark respectively are sensed;

said elongated strip being a film carrying the information and the frame and group marks thereon in the form of variations in optical density and in which each frame mark is located in one margin of the film adjacent to the corresponding frame and each group mark is located in the opposite margin of the film adjacent to the corresponding frame, the mark counter also being applicable to a film in which the relative positions of the frame and group marks are reversed;

said sensing means comprising first and second sensors arranged adjacent to the one and the opposite film margins respectively to sense the one of the frame marks and group marks which is in the corresponding margin and produce the corresponding one of said first and second electrical signals respectively in response thereto;

computing means responsive to said first and second electrical signals and operative to compute the logical sum and produce of the total numbers of said first and second electrical signals respectively produce by said sensing means;

said computing means comprising a computing circuit including an OR gate and an AND gate, each of which is responsive to both of said first and second electrical signals, whereby the total number of electrical sum signals produced by said OR gate is equal to the logical sum of the total numbers of said first and second electrical signals produced by said first and second sensors, the total number of electrical product signals produced by said AND gate being equal to the logical product of the total numbers of said first and second electrical signals produced by said first and second sensors;

said computing means being further operative to stop movement of said film when a selected one of said logical sum and product is equal to a preset value corresponding to the desired frame so that the desired frame is placed in the information retrieval position; and said computing means comprising means which is operative to selectively count one of said sum signals and said product signals and control said drive means to effect said stop movement of the film when the count is equal to said preset value.

2. A mark counter according to claim 1, in which said computing means further comprises switch means to selectively connect said OR gate and said AND gate with said counting means;

said switch means normally blocking electrical communication therethrough and being manually setable to selectively allow electrical communication therethrough between one of said OR gate and said AND gate and said counting means prior to a movement of the film; and in which said counting means is further operative to feed an electrical reset signal to said switch means to reset said switch means to the normal condition thereof in which electrical communication therethrough is blocked when the drive means is controlled by said counting means to stop movement of the film when the count thereof is equal to said preset value.

3. A mark counter according to claim 2, in which said counting means comprises an incremental and decremental counter connected to said switch means and a control circuit connected to said incremental and decremental counter and said switch means;

said control circuit being responsive to the count of said counter and operative to switch said counter to an incremental mode when the count is less than said preset value and switch said counter to a decremental mode when the count is greater than said preset value;

said control circuit being further operative to control the drive means to move the film in one direction when said counter is in the incremental mode and in the opposite direction when said counter is in the decremental mode; and said control circuit being still further operative to control the drive means to stop movement of the film and feed said reset signal to said switch means when the count of the counter is equal to said preset value.

4. A mark counter according to claim 3, in which said switch means comprises;

a first flip-flop having a manual set input and a reset input connected to said control circuit to receive said reset signal therefrom;

a second flip-flop having a manual set input and a reset input connected to said control circuit to receive said reset signal therefrom;

a first AND gate having one input connected to the output of said OR gate and another input connected to the output of said first flip-flop;

a second AND gate having one input connected to the output of said second flip-flop and another input connected to the output of said AND gate; and a first OR gate having inputs connected to the outputs of said first and second AND gates and an output connected to the input of said counter.

5. A mark counter according to claim 3, in which said control circuit comprises a numerical entry device to manually enter said preset value.

6. A mark counter according to claim 1, further comprising a light source to project a beam of light through the film, and in which said first and second sensors are photosensitive units arranged to produce said first and second electrical signals when the corresponding one of a frame mark and a group mark respectively pass over said light source.

7. A device for retrieving information stored on an elongated strip of material in the form of longitudinally successive frames, the elongated strip having a detectable frame mark in one margin adjacent to each frame and a detectable group mark in the other margin adjacent to the first frame of each group of frames, the device also being applicable to an elongated strip in which the relative positions of the frame and group marks are reversed and comprising:

read-out means for retrieving the information from a desired frame and drive means for moving the elongated strip through the read-out means to place the desired frame in an information retrieval position;

first and second sensors operatively arranged adjacent to the opposite margins of the elongated strip to sense the one of the frame and group marks located in the corresponding margin as the elongated strip moves through the read-out means and produce first and second electrical signals respectively each time a mark is sensed;

computing means responsive to said first and second electrical signals and operative to compute the logical sum and product of the total numbers of said first and second electrical signal respectively produced by said first and second sensors;

said computing means comprising a computing circuit connected to said first and second sensors and including an OR gate and an AND gate, each of which is responsive to both of said first and second electrical signals, whereby the total number of electrical sum signals produced by said OR gate is equal to the logical sum of the total numbers of said first and second electrical signals produced by said first and second sensors respectively, and the total number of electrical product signals produced by said AND gate is equal to the logical product of the total numbers of said first and second electrical signals produced by said first and second sensors respectively;

counting means connected to said computing means and operative to count a selected one of said sum signals and said product signals; and a control circuit connected to said counting means and operative to control the drive means to stop movement of the elongated strip when a selected one of said logical sum and product is equal to a preset value corresponding to the desired frame so that the desired frame is placed in the information retrieval position.

8. A device according to claim 7, in which said computing means further comprises switch means to selectively connect said OR gate and said AND gate of said computing circuit with said counting means;

said switch means normally blocking electrical communication therethrough and being manually settable to selectively allow communication therethrough between one of said OR gate and said AND gate and said counting means prior to a movement of the elongated strip;

said counting means comprising an incremental and decremental counter;

said control circuit being responsive to the count of said counter and being operative to switch said counter to an incremental mode when the count is less than said preset value and switch said counter to a decremental mode when the count is greater than the preset value;

said control circuit being further operative to control the drive means to move the elongated strip in one direction when said counter is in the incremental mode and in an opposite direction when said counter is in the decremental mode;

said control circuit being further operative to control the drive means to stop movement of the elongated strip and feed an electrical reset signal to said switch means when the count is equal to the preset value;

said reset signal resetting said switch means to the normal condition thereof in which electrical communication therethrough is blocked; and said control circuit further comprising a numerical entry device to manually enter said preset value.

9. A device according to claim 8, in which said switch means comprises:

a first flip-flop having a manual set input and a reset input connected to said control circuit to receive said reset signal therefrom;

a second flip-flop having a manual set input and a reset input connected to said control circuit to receive said reset signal therefrom;

a first AND gate having one input connected to the output of said OR gate and another input connected to the output of said first flip-flop;

a second AND gate having one input connected to the output of said second flip-flop and another input connected to the output of said AND gate;

first OR gate having its inputs connected to the outputs of said first and second AND gates and its output connected to the input of said counter.

* * * * *